(12) United States Patent
Huang et al.

(10) Patent No.: US 7,868,800 B2
(45) Date of Patent: Jan. 11, 2011

(54) MIXED-SIGNAL CONTROL APPARATUS OF MODULATION SYSTEM

(75) Inventors: Yu-Chi Huang, Hsinchu (TW); Hsin-Chao Chen, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 48 days.

(21) Appl. No.: 12/394,049

(22) Filed: Feb. 27, 2009

(65) Prior Publication Data
US 2010/0097254 A1 Apr. 22, 2010

(30) Foreign Application Priority Data
Oct. 22, 2008 (TW) ............... 97140510 A

(51) Int. Cl.
*H03M 1/00* (2006.01)
(52) U.S. Cl. ............... 341/142; 341/144; 341/155; 341/143
(58) Field of Classification Search ......... 341/118–120, 341/143, 144, 155, 142
See application file for complete search history.

(56) References Cited

U.S. PATENT DOCUMENTS
7,315,269 B2 * 1/2008 Schreier et al. ............ 341/143

OTHER PUBLICATIONS

Authored by Peterchev, et al., article titled "Quantization Resolution and Limit Cycling in Digitally Controlled PWM Converters," adopted from IEEE Transactions on Power Electronics, vol. 18, No. 1, Jan. 2003.
Authored by Peng, et al., article titled "Modeling of Quantization Effects in Digitally Controlled DC-DC Converters," adopted from 35TH Annual IEEE Power Electronics Specialists Conference, AAchen, Germany, 2004.
Authored by Huang, et al., article titled "Dual-Section-Average(DSA) Analog-to Digital Converter(ADC) in Digital Pulse Width Modulation (DPWM) DC-DC Converter for Reducing the Problem of Limiting Cycle", adopted from the IEEE Asian Solid-State Circuits Conference, Fukuoka, Japan, Nov. 3-5, 2008.

* cited by examiner

*Primary Examiner*—Jean B Jeanglaude
(74) *Attorney, Agent, or Firm*—Jianq Chyun IP Office

(57) ABSTRACT

A mixed-signal control apparatus of a modulation system is provided. The mixed-signal control apparatus includes a digital-to-analog converter (DAC) unit, an analog-to-digital converter (ADC) unit, and a processing unit. When a quantization step of the ADC unit is $q_{ADC}$, a quantization step of the DAC unit is $q_{DAC}$, and a transfer function of the modulation system is $G_0$, $q_{ADC} \leq G_0 q_{DAC}$. A controlled variable is finely converted by using the ADC unit having a very high resolution. In such a way, it can be ensured that data in an analog domain can be transmitted to a discrete domain with the least distortion, thus achieving a robust and simple control.

21 Claims, 9 Drawing Sheets

MIXED-SIGNAL CONTROL APPARATUS OF MODULATION SYSTEM

CROSS-REFERENCE TO RELATED APPLICATION

This application claims the priority benefit of Taiwan application serial no. 97140510, filed on Oct. 22, 2008. The entirety of the above-mentioned patent application is hereby incorporated by reference herein and made a part of specification.

BACKGROUND OF THE INVENTION

1. Field of the Invention

The present invention relates to a mixed-signal control apparatus.

2. Description of Related Art

Generally, normal electronic products often employ modulation systems for modulating some controlled variables X (e.g., voltage, current, frequency, oscillation amplitude, phase, and pulse width). For example, a DC-DC converter is a typical one of the modulation systems. The DC-DC converter is adapted to modulate an input voltage into an output voltage Vo with a rated level. An analog control apparatus is capable of precisely controlling the modulation system to the specified controlled variable X. In principle, the controlled variable X in an analog control mode can be modulated to achieve any desired level despite affections by a loop gain, a thermal effect, and noises.

Correspondingly, in accordance with a digital control technology for a modulation system, a mixed-signal control apparatus is often employed for controlling the modulation system. The mixed-signal control apparatus employs a quantizing element to convert a controlled variable X of an analog domain outputted from the modulation system into a discrete domain, so as to control/calculate the controlled variable X with digital techniques, thus generating a digital control signal. Finally, another quantizing element converts the digital control signal back to a control signal of the analog domain, so as to control the modulation system to the specified controlled variable X.

Using a conventional mixed-signal control apparatus may disadvantageously cause affections including limit cycle, and process voltage temperature (PVT) variation. Generally, in order to reduce power consumption, delay cells are frequently employed in designing the architecture of the mixed-signal control apparatus. However, the said architecture does not include any precise reference circuit or regulation circuit, thus seriously suffering the affection of the PVT variation.

In terms of digital controlling, the limit cycle is actually caused by the discrete and finite setting points set by the quantizing element. The quantizing element hereby means an analog-to-digital converter (ADC) unit and a digital-to-analog converter (DAC). The limit cycle, which is a phenomenon of voltage jumping, is often caused by unmatched resolutions between the ADC unit and the DAC unit. Generally, the so-called resolution hereby is determined in accordance with the number of the setting points. For example, in a binary control system, an n-bit control character can generate $2^n$ setting point statuses, which is used for representing the resolution of the binary control system. Taking a switching power system as an example, when a pulse width is modulated by $2^n$ data (resolution), a quantization step thereof can be represented by $VIN/2^n$.

If the resolution of the DAC unit is lower than the resolution of the ADC unit, a least significant bit (LSB) of the ADC unit will remain varying, because the output voltage modulated by the DAC unit fails to match the resolution of the ADC unit. As such, the system cannot latch up the output voltage, so that the phenomenon of output voltage jumping, which is known as the limit cycle, occurs. As shown in FIG. 1, a quantization step of the ADC unit is $q_{ADC}$, and a quantization step of the DAC unit is $q_{DAC}$. The controlled variable (e.g., an output voltage Vo) outputted from the modulation system controlled by the DAC unit fails to match the resolution of the DAC unit, thus remaining varying. Therefore, the system is incapable of latching up the output voltage Vo, thus generating the voltage jumping phenomenon.

The limit cycle is a common problem which occurs in all mixed-signal circuits including feedback control (circuits including analog signals and digital signals at the same time). A conventional solution to the limit cycle is to utilize a relative large quantization step, so that when the circuit is stable, the digital output of the ADC unit does not vary with the analog input, so as to stabilize the system. In other words, the system is an open loop system at this time. Mixed-signal control apparatuses for conventional modulation systems are required to satisfy equation (1) as follows.

$$q_{ADC} > G_0 q_{DAC} \quad (1),$$

in which $G_0$ represents a control to output gain, i.e., a transfer function of the modulation system.

When the modulation system is exemplified as a power device, the controlled variable can be an output voltage of the power device, the mixed-signal control apparatus can be a digitally controlled PWM apparatus, and the DAC unit can be a digital pulse width modulation (DPWM) unit. Generally, a quantization step $q_{ADC}$ of a ADC unit and a quantization step of the DPWM unit $q_{DPWM}$ in digitally controlled PWM satisfy equation (2) as follows.

$$G_0 q_{DPWM} < \alpha q_{ADC} \quad (2),$$

in which $\alpha$ is a constant.

When a small $G_0$ is selected, the limit cycle can be avoided. However, this unfortunately means a slow response. Further, in order to avoid the limit cycle, the $q_{DPWM1\ (or\ qDAC)}$ should be designed to have a very small value. However, this means the resolution of the DPWM unit (or the DAC unit) is higher than the resolution of the ADC unit by 2 bits more than usually suggested. For example, if the resolution of the ADC unit is 8 bits, then the resolution of the DAC unit is 10 bits. As shown in FIG. 2, when the resolution of the ADC unit is higher than the resolution of the DAC unit, it means that the quantization step $q_{DAC}$ of the DAC unit must be smaller than the quantization step $q_{ADC}$ for satisfying equation (1).

Further, there will be a trade off between to satisfy equation (1) and to achieve a lower power design. When the designer intends to achieve a lower power by increasing $q_{ADC}$, he may also obtain a larger variation range of the output voltage Vo. As shown in FIG. 2, the output voltage Vo can be anywhere of a $q_{ADC}$. According to an assumption that $q_{ADC}=100$ mV, the output voltage Vo has a variation range of 100 mV, but the digital output of the ADC unit remains unchanged.

Furthermore, in view of the requirement of satisfying equation (1), when the designer intends to increase the response speed by increasing $G_0$, he has to reduce $q_{DAC}$ at the same time, so as to increase the resolution of the DAC unit (i.e., increase the bit number of the DAC unit). However, it is a challenge for digital ICs to increase the resolution of the DAC units, because many problems and design complexity will be caused by increasing DAC clock speed. For example, with respect to DPWM design, if it has a resolution of 10 bits (e.g., the resolution of the ADC unit is 9 bits), and a switching frequency fsw of the power device to be designed is 1 MHz (i.e., having a period of 1 μs), then a corresponding time of each LSB is 1 μs/$2^{10}$=1 μs/1024=977 ps. In order to achieve such speed, the operation frequency of the DPWM unit must be as high as 1/(977 ps)=1.024 GHz.

In U.S. Pat. No. 7,301,488, Leung discloses that Silicon Laboratories Inc. resolves the issue of the limit cycle based on equation (1) or equation (2). Leung further proposes to achieve a digital PWM unit having a relatively high resolution by employing a programmable dither technique. However, since the issue of limit cycle is resolved based on equation (1) or equation (2), a controller, a filter, and a programmable dither control are required for complying with an adaptive adjustment.

SUMMARY OF THE INVENTION

Accordingly, the present invention is directed to provide a mixed-signal control apparatus of a modulation system for converting an analog data into a digital data with the least distortion, so as to achieve a robust and simple control of the modulation system.

According to an embodiment of the present invention, a mixed-signal control apparatus of a modulation system is provided. The mixed-signal control apparatus includes a digital-to-analog converter (DAC) unit, an analog-to-digital converter (ADC) unit, and a processing unit. The DAC unit outputs an analog control signal for controlling an output of the modulation system. The ADC unit generates a corresponding digital feedback signal according to the output of the modulation system. If a quantization step of the ADC unit is $q_{ADC}$, a quantization step of the DAC unit is $q_{DAC}$, and a transfer function of the modulation system is $G_0$, then $q_{ADC} \leq G_0 q_{DAC}$. The processing unit is coupled between the ADC unit and the DAC unit. The processing unit receives and adjusts the digital feedback signal, so as to generate a digital control signal. The DAC unit converts the digital control signal into an analog control signal.

To make the above and other features and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
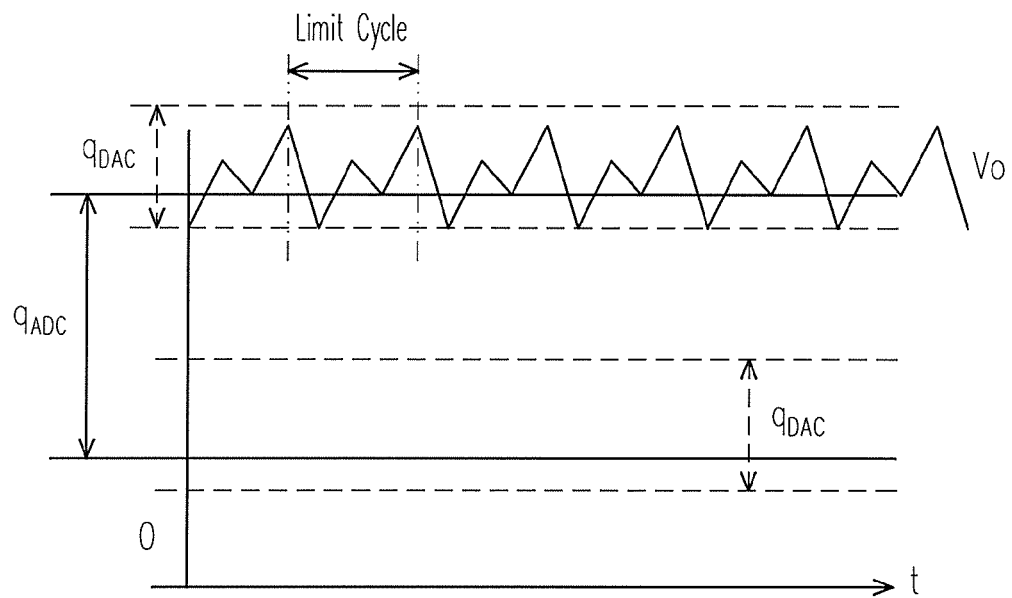
FIG. 1 is a schematic diagram illustrating a conventional digital PWM control apparatus, showing the occurrence of the limit cycle even when the quantization step $q_{DPWM}$ of the digital PWM unit is smaller than the quantization step $q_{ADC}$ of the ADC unit.
Figure 2:
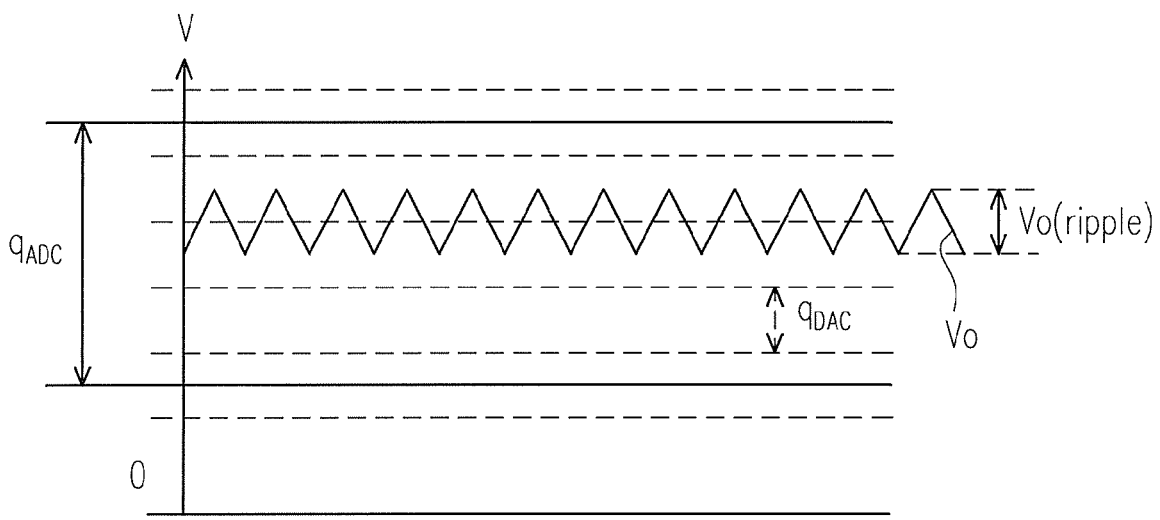
FIG. 2 illustrates a conventional digital PWM control apparatus which narrows the quantization step $q_{DPWM}$ of the digital PWM unit (smaller than ¼ of the quantization step $q_{ADC}$) for the purpose of reducing the chance that the limit cycle occurs.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
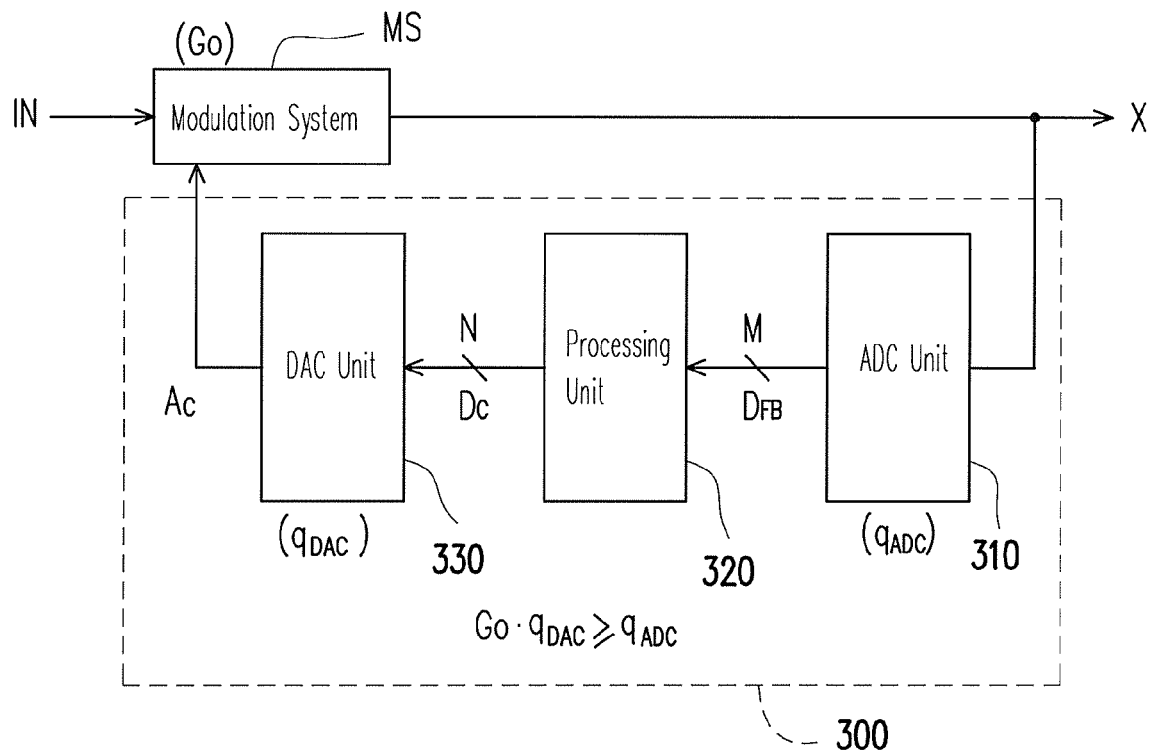
FIG. 3A is a block diagram of a mixed-signal control apparatus of a modulation system according to an embodiment of the present invention.

FIG. 3A is a block diagram of a mixed-signal control apparatus of a modulation system MS according to an embodiment of the present invention. The modulation system MS is controlled by a mixed-signal control apparatus 300 to modulate/convert an input IN into a controlled variable X (i.e., an output of the modulation system MS). The input IN and the controlled variable X can be any of the physical quantities including voltage, current, frequency, oscillation amplitude, phase, and pulse width. The mixed-signal control apparatus 300 includes an analog-to-digital converter (ADC) unit 310, a processing unit 320, and a digital-to-analog converter (DAC) unit 330. The ADC unit 310 is coupled to an output terminal of the modulation system MS. The DAC unit 330 is coupled to a control terminal of the modulation system MS. The processing unit 320 is coupled between the ADC unit 310 and the DAC unit 330.

The ADC unit 310 generates a digital feedback signal $D_{FB}$ according to the controlled variable X outputted from the modulation system MS. The processing unit 320 receives and adjusts the digital feedback signal $D_{FB}$, so as to generate a digital control signal $D_C$. The DAC unit 330 converts the digital control signal $D_C$ into an analog control signal $A_C$ for controlling the controlled variable X outputted from the modulation system MS.

Figure 3B:
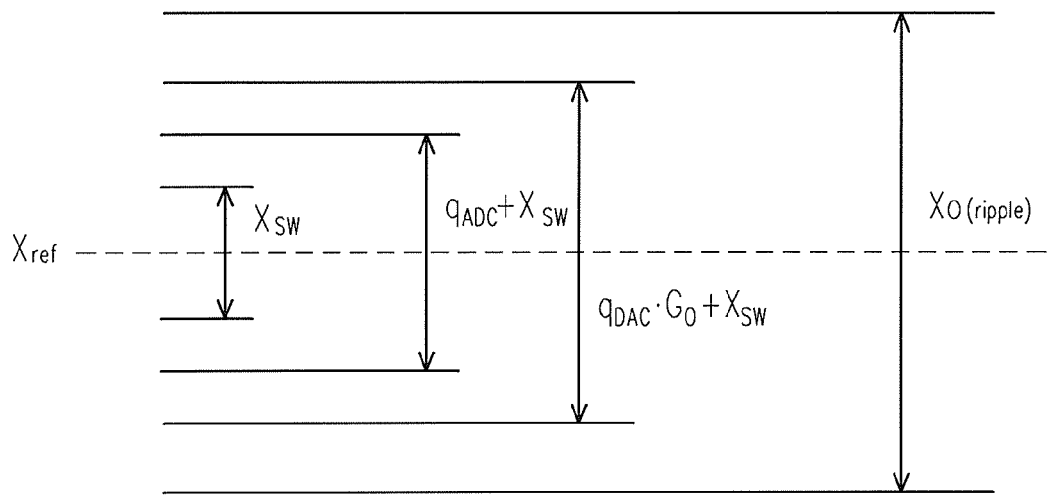
FIG. 3B illustrates a relative correlation among the controlled variable X, a disturbance $X_{SW}$, a rated output ripple $X_{O(ripple)}$, the quantization step $q_{DAC}$ of the DAC unit 330, and the quantization step $q_{ADC}$ of the ADC unit 310 of FIG. 3A.

It is assumed that a quantization step of the ADC unit 310 is $q_{ADC}$, a quantization step of the DAC unit 330 is $q_{DAC}$, a transfer function of modulation system MS is $G_0$, a disturbance of the modulation system MS is $X_{SW}$, and a rated output ripple of the modulation system MS is $X_{O(ripple)}$. FIG. 3B illustrates a relative correlation among the controlled variable X, the disturbance $X_{SW}$, the rated output ripple $X_{O(ripple)}$, the quantization step $q_{DAC}$ of the DAC unit 330, and the quantization step $q_{ADC}$ of the ADC unit 310. $X_{ref}$ represents an ideal value (reference value) of the controlled variable X outputted from the modulation system MS.

In fact, during the operation of the modulation system MS, the controlled variable X outputted from the modulation system MS almost always includes a certain disturbance $X_{SW}$. The controlled variable X outputted from the modulation system MS is not as steady as presented by the reference value $X_{ref}$. On the contrary, the controlled variable X outputted from the modulation system MS in fact varies in a range defined by the disturbance $X_{SW}$ as shown in FIG. 3B. Generally, the system is usually designed for meeting specific requirements in expectation. As such, as long as the disturbance $X_{SW}$ applied to the controlled variable X practically outputted form the modulation system MS meets the specification requirement (i.e., the disturbance $X_{SW}$ is within the range of the rated output ripple $X_{O(ripple)}$), the controlled variable X is considered as being controlled within an acceptable stable value.

Referring to FIGS. 3A and 3B, when the controlled variable X is controlled within an acceptable stable value, which meets the specification requirement of the rated output ripple $X_{O(ripple)}$, the system of FIG. 3A must be designed as follows. In order to control the controlled modulation system MS to achieve a stable output without being affected by the PVT variations, certain fine variations of the controlled variable X must be detected by the ADC unit 310. The fine variations should be small enough to a specific degree that the controlled variable X generated by each quantization step of the analog control signal $A_C$ via the modulation system MS can be converted. In other words, the mixed-signal control apparatus 300 must be designed to satisfy the following equation (3).

$$q_{ADC} \leq G_0 q_{DAC} \quad (3)$$

In other embodiments, the disturbance $X_{SW}$ can also changed by adjusting parameters of the modulation system MS or by determining the quantization step $q_{ADC}$ of the ADC unit 310, so as to detect the controlled variable X finely varying within a range of "the rated output ripple $X_{O(ripple)}$ minus a fixed system disturbance $X_{SW}$". In other words, in the current embodiment, the mixed-signal control apparatus 300 should be designed for satisfying equation (4) as follows.

$$q_{ADC} \leq X_{O(ripple)} - X_{SW} \quad (4)$$

Further, with respect to the DAC unit 330, the controlled variable X generated by the quantization step $q_{DAC}$ via the modulation system MS can be set within the range of "the rated output ripple $X_{O(ripple)}$ minus the fixed system disturbance $X_{SW}$". In other words, in some other embodiments, the mixed-signal control apparatus 300 should be designed to satisfy equation (5) as follows.

$$q_{DAC} \leq \frac{X_{O(ripple)} - X_{SW}}{G_0} \quad (5)$$

Those skilled in the art may modify the foregoing embodiments in accordance with practical design requirements as desired. For example, when the controlled variable X is set out of range of the rated output ripple variable $X_{O(ripple)}$, the ADC unit 310 and the DAC unit 330 can have monotone increasing conversion characteristics and are not governed by the foregoing equations (3), (4), and (5). When the controlled variable X is within the range of the rated output ripple $X_{O(ripple)}$, the transfer characteristics of the ADC unit 310 and the DAC unit 330 must satisfy equations (3), (4), and (5).

Figure 3C:
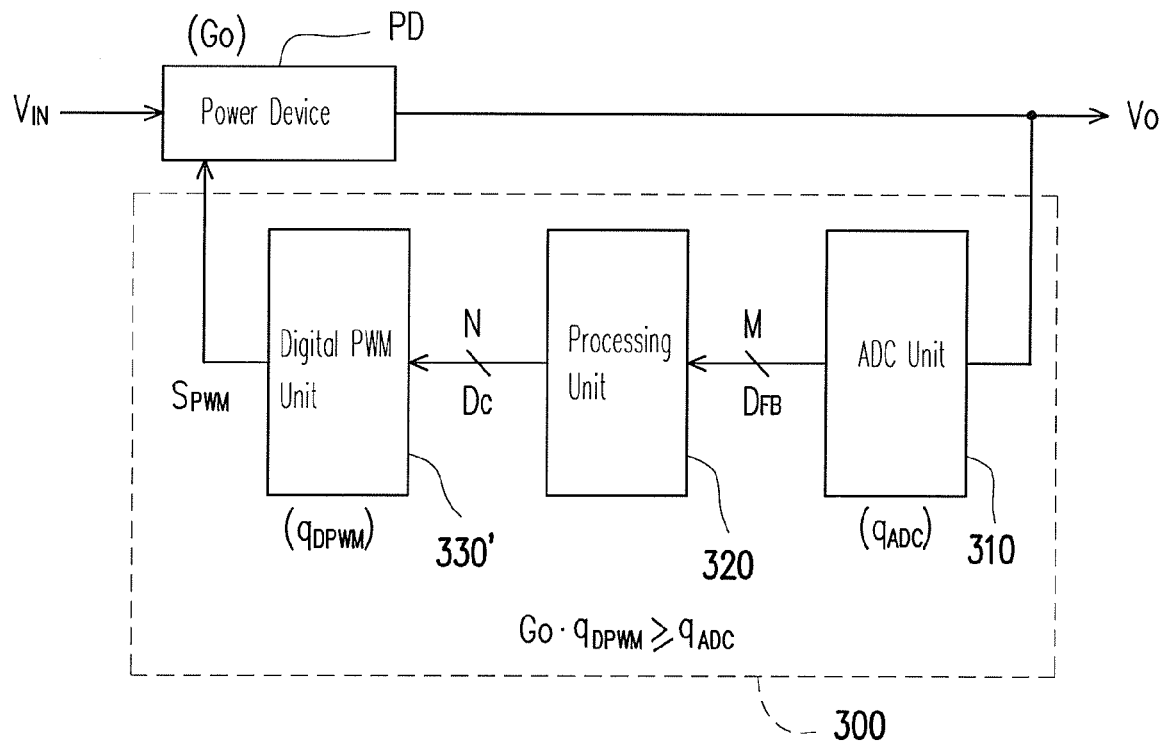
FIG. 3C is a block diagram illustrating a digitally controlled PWM apparatus according to an embodiment of the present invention.

Further, the foregoing modulation system MS can be a motor driving system, a frequency modulation system, a phase modulation system, an amplitude modulation system, a power device, or a power source system. For example, a DC-DC converter is a typical one of the modulation systems. A DC-DC converter is adapted to modulate an input voltage into an output voltage Vo with a rated level. When a power device PD is exemplified for illustrating the modulation system MS of the present invention, the controlled variable X can be the output voltage $V_O$, and the mixed-signal control apparatus 300 can be a digitally controlled PWM apparatus, in which the DAC unit 330 can be a DPWM unit 330'. Therefore, a quantization step $q_{DPWM}$ of the DPWM unit 330' in the following embodiment as shown in FIG. 3C is equivalent to the quantization step $q_{DAC}$ of the DAC unit 330 as shown in FIG. 3A. In other embodiments, the DAC unit 330 may be a pulse amplitude modulation (PAM) unit or other conversion units.

FIG. 3C is a block diagram illustrating a digitally controlled PWM apparatus according to an embodiment of the present invention. Referring to FIG. 3C, the digitally controlled PWM apparatus (i.e., the mixed-signal control apparatus 300) includes an ADC unit 310, a processing unit 320, and a digital PWM unit 330'. The DPWM unit 330' outputs a PWM signal $S_{PWM}$ (i.e., the analog control signal $A_C$) to the power device PD. Controlled by the PWM signal $S_{PWM}$, the power device PD converts an input $V_{IN}$ into an output $V_O$ and generates a corresponding digital feedback signal $D_{FB}$ to the processing unit 320. The processing unit 320 is coupled between the ADC unit 310 and the DPWM unit 330'. The processing unit 320 receives and adjusts the digital feedback signal $D_{FB}$ provided by the ADC unit 310, thus generating a digital control signal $D_C$ to the digital PWM unit 330'. The DPWM unit 330' converts the digital control signal DC into the PWM signal $S_{PWM}$.

Figure 4:
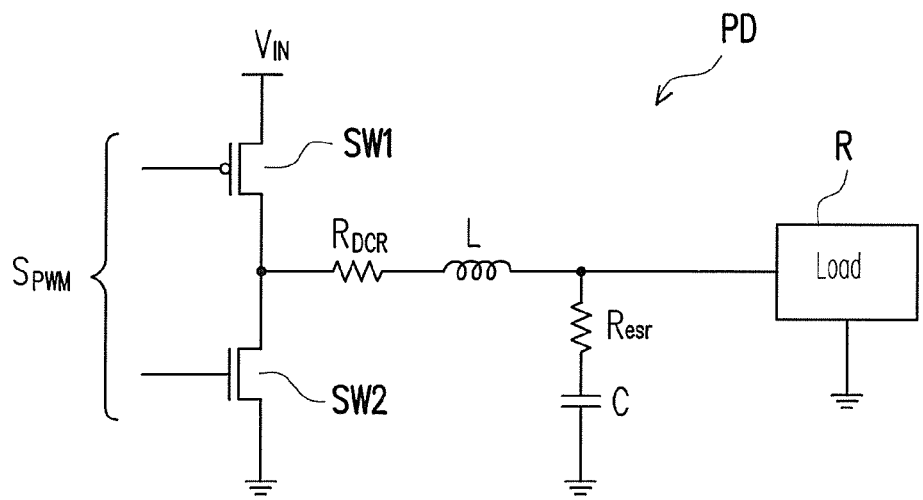
FIG. 4 is a circuit diagram of the power device shown in FIG. 3C.

The power device PD can be any device adapted for providing or converting a power (or a power source). For example, the power device can be a DC-DC converter, a buck converter, a boost converter, or the like. Taking the buck converter for example, FIG. 4 is a circuit diagram of the power device PD shown in FIG. 3C. Referring to FIG. 4, the power device PD is a buck converter including an high side power switch SW1, a low side power switch SW2, an inductor L, and a capacitor C. As shown in FIG. 4, resistors $R_{DCR}$ and $R_{esr}$ are effective resistors of internal conducting paths of the power device PD. The power switches SW1 and SW2 are serially coupled between an input voltage $V_{IN}$ and a ground, and are controlled by the PWM signal $S_{PWM}$. The inductor L and the capacitor C are serially coupled between a drain of the power switch SW1 and the ground. The inductor L can generate rated output voltage $V_O$ by controlling the conducting times of the power switches SW1 and SW2.

Figure 6:
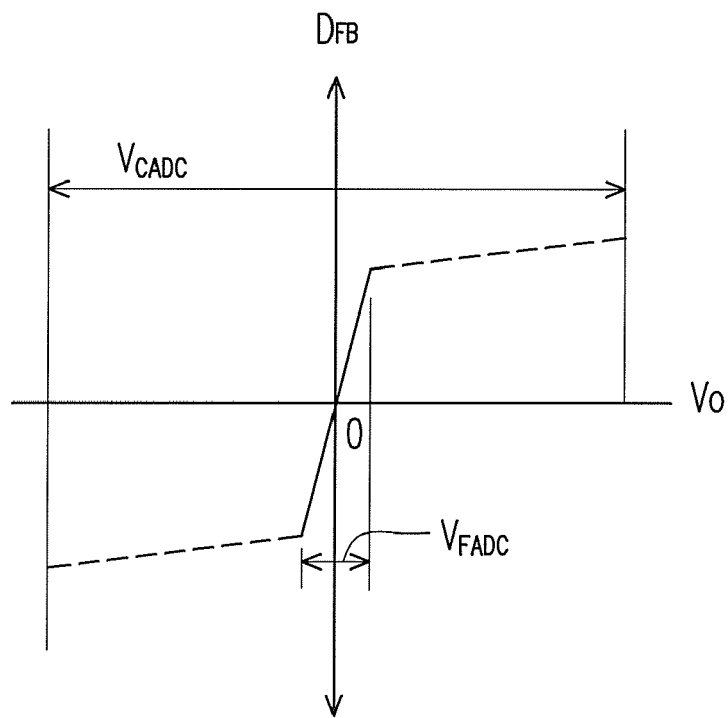
FIG. 6 is a curve illustrating conversion characteristic of an ADC unit having multiple conversion slops according to an embodiment of the present invention.

In the current embodiment, the relationship between the quantization step $q_{ADC}$ of the ADC unit 310 and the quantization step $q_{DPWM}$ of the digital PWM unit 330' is designed to satisfy equation (6). The quantization step $q_{DPWM}$ of FIG. 6 is equivalent with the quantization step $q_{DAC}$ of FIG. 3. The quantization step is also known as the value of the quantizer's LSB. $G_0$ represents a control to output gain, which is the transfer function of the power device PD. In some embodiments, if a bit number of the digital control signal $D_C$ received by the DPWM unit 330' is N, then the quantization step $q_{DPWM}$ is $V_{IN}/2^N$. If a bit number of the digital feedback signal $D_{FB}$ outputted from the ADC unit 310 is M, then the quantization step $q_{ADC}$ of the ADC unit 310 is $V_{IN}/2^M$.

$$q_{ADC} \leq G_0 q_{DPWM} \quad (6)$$

The design principle shown in FIG. 3C is going to be discussed in further details below. Referring to FIG. 3C, the digital control signal $D_C$ provided to the DPWM unit 330' is not directly provided by the ADC unit 310. Infact, prior to being provided to the DPWM unit 330', the digital control signal $D_C$ has been processed by the processing unit 320. In the current embodiment, the processing unit 320 can be a proportional-integral-differential (PID) processor. The output voltage $V_O$ is converted by the ADC unit 310 into a binary digital feedback signal $D_{FB}$. When performing the PID processing, the processing unit 320 regulates the output of the ADC unit 310, so as to generate the digital control signal $D_C$ and provide the digital control signal $D_C$ to the digital PWM unit 330'. The processing unit 320 can convert the output of the ADC unit 310 in accordance with the following equation (7) or in accordance with other algorithms, and provide the subsequently obtained digital control signal $D_C$ to the DPWM unit 330'.

$$D_C(k+1) = Kp \cdot De(k) + Kd \cdot [De(k) - De(k-1)] + Ki \cdot Di(k) + Dref(k) \quad (7),$$

in which $D_C(k+1)$ represents a digital control signal $D_C$ containing a duty cycle information and to be next transmitted to the digital PWM unit 330'. Di(k) represents a current summing integral difference, which can be represented by Di(k)=Di(k−1)+De(k) (i.e., a final summing integral difference plus an error quantity). In other words, the current summing integral difference is equal to a sum of a previous sampled condition and a presently obtained error signal. De(k) represents the present error signal, which can be represented by De(k)=Dref(k)−$D_{FB}$(k) (i.e., a reference signal minus the present digital feedback signal $D_{FB}$). Each factor of equation (7) is provided with required corresponding information, so as to obtain a better duty cycle information. The better duty cycle information is thus provided to the DPWM unit 330' to drive the power switch of the power device PD.

In equation (7), each factor has a corresponding parameter adjusting the weight thereof, in which Kp is a proportional coefficient representing an adjusting parameter adapted for adjusting the gain so as to change the sensitivity. Ki is an integral coefficient representing an adjusting parameter of the accumulated error quantity integrated in accordance with time. The error Di(k) integrated by equation (7) is adjusted to 0, so as to adjust the output voltage $V_O$ to a desired setting value. Kd is a derivative coefficient representing an adjusting parameter of a delay time accumulated by the entire loop system. The delay of time causes phase deviation, and therefore Kd should be regulated to ensure the stability of the system. The effect of adjusting Kd is similar to an adjustment to zero position in an analog design. Meanwhile, the Kd adjustment compensates the delay caused by Ki.

With respect to the PID processing function of the processing unit 320, the frequency response, the loop gain, and the loop phase can be adjusted by adjusting the foregoing parameters. Similar to the design of the analog control power source, the design discussed in the current embodiment achieves required frequency response and desired stability by adjusting the controlling parameters. Typically, at the first time of setting the parameters, the parameters are set in accordance with calculation or deduced from analog designing theories. In practical operation, requirements usually satisfied in the analog design can be achieved in a system of a digital controlled power source by adjusting Ka, Ki, and Kd. The controlling parameters of the PID processor are all recorded in a memory of the processing unit 320, and therefore can be configuration, reconfiguration and can precisely adjust features regarding frequency response, output characteristic and loop control.

In order to allow the negative feedback control to occur whenever desired, the resolution of the ADC unit 310 is designed to be higher than the resolution of the digital PWM unit 330', thus satisfying equation (6) (not satisfying equations (1) and (2)), so that the negative feedback applies. A limit cycle is raised when the resolutions of the ADC unit 310 and the DPWM unit 330' are set to satisfy equation (6). However, as long as the resolution of the ADC unit 310 is designed to be high enough, the limit cycle can be restrained to satisfy equations (8) and (9) as follows by employing a well designed compensation. The well designed compensation can be realized by adjusting the controlling parameters Ka, Ki, and Kd of the processing unit 320 to increase the gain and bandwidth.

$$V_{O(ripple)} \geq q_{ADC} + SW_{(ripple)} \quad (8)$$

$$V_{O(ripple)} \geq \Delta V_O + SW_{(ripple)} \quad (9)$$

Figure 5A:
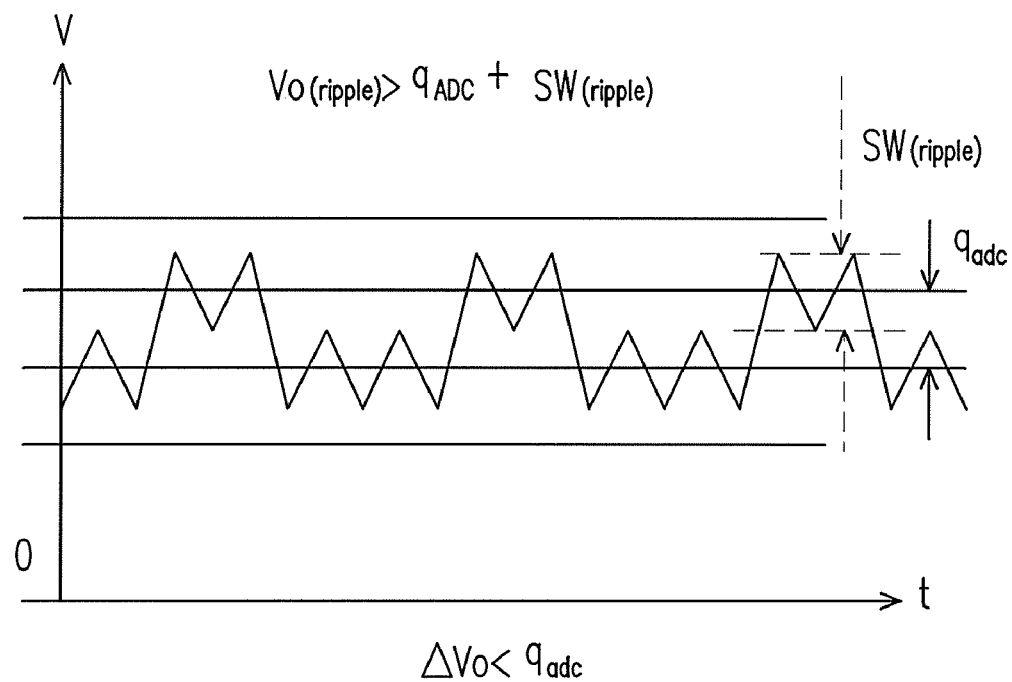
FIG. 5A is a diagram illustrating that under the condition of $\Delta V_O < q_{ADC}$, a sum of the quantization step $q_{ADC}$ and a ripple $SW_{(ripple)}$ switched by the power switch is smaller than the rated outputting ripple $V_{O(ripple)}$ according to an embodiment of the present invention.
Figure 5B:
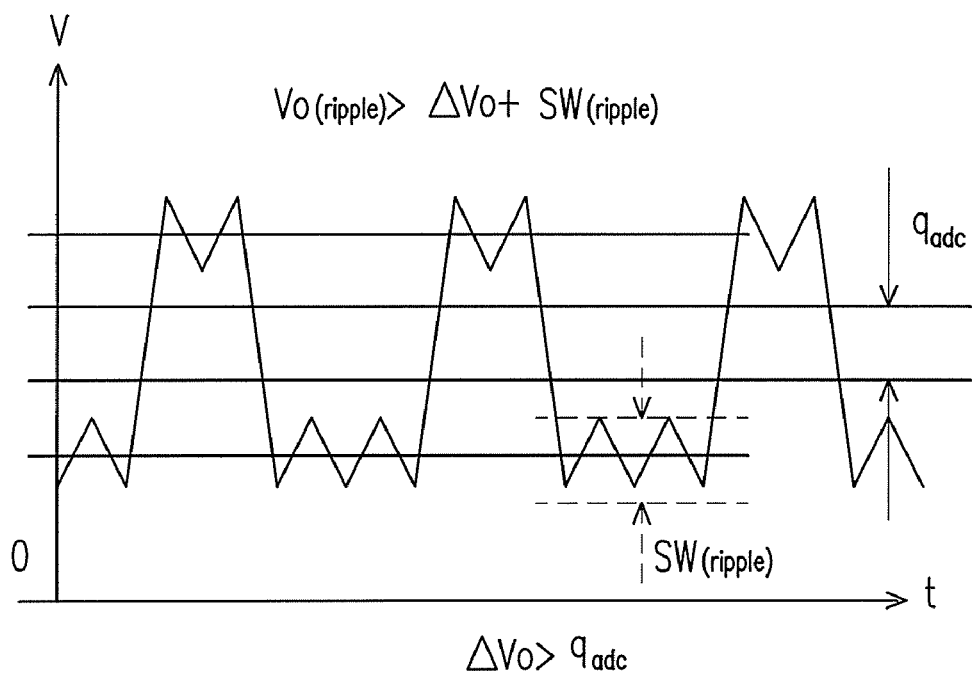
FIG. 5B is a diagram illustrating that under the condition of $\Delta V_O > q_{ADC}$, a sum of a variation of the output $V_O$ and a ripple $SW_{(ripple)}$ generated by the switching of power switch is smaller than the rated output ripple $V_{O(ripple)}$ according to an embodiment of the present invention.

$SW_{(ripple)}$ represents a ripple or a disturbance generated by a switching operation of a power switch of the power device PD. $SW_{(ripple)}$ is equivalent to $X_{SW}$ of equation (4). $V_{O(ripple)}$ is a specification which represents a ripple of an output voltage $V_O$. $V_{O(ripple)}$ is a ripple slightly larger than $SW_{(ripple)}$, as shown in FIGS. 5A and 5B. $V_{O(ripple)}$ is equivalent to $X_{O(ripple)}$ of equation (4). Supposing that $\Delta V_O$ is a variation of the output $V_O$ of the power device PD which can be controlled by the DPWM unit 330', $\Delta V_O$ can be defined by equation (10).

$$q_{DPWM} \times G_0 = \Delta V_O \quad (10)$$

FIG. 5A illustrates that under the condition of $\Delta V_0 < q_{ADC}$, a sum of the quantization step $q_{ADC}$ and a ripple $SW_{(ripple)}$ generated by the switching of power switch is smaller than the $V_{O(ripple)}$ (i.e., equation (8)), by adjusting the controlling parameters of the processing unit 320 according to an embodiment of the present invention. FIG. 5B illustrates that under the condition of $\Delta V_0 > q_{ADC}$, a sum of a variation $\Delta V_O$ at output $V_O$ and a ripple $SW_{(ripple)}$ generated by the switching of power switch is smaller than the $V_{O(ripple)}$ (i.e., equation (9)), by adjusting the controlling parameters of the processing unit 320 according to an embodiment of the present invention.

Considering the relative high resolution of the ADC unit 310, the resolution of the DPWM unit 330' can be reduced. In a single switching duty cycle, when the DPWM unit 330' is increased or decreased by one $q_{DPWM}$, the corresponding variation $\Delta V_0$ of the controlled variable is rather subtle. As long as the variation $\Delta V_0$ does not exceed the specified and rated $V_{O(ripple)}$, the $q_{DPWM}$ facilitated with well designed compensation (e.g., adjusting the controlling parameters of the processing unit 320 for increasing the gain and the bandwidth) can be used to achieve the requirement for reducing the resolution of the DPWM unit 330'. It can be seen from equation (10) that so far as satisfying the specified and rated $V_{O(ripple)}$, the quantization step $q_{DPWM}$ of the DPWM unit 330' can be increased to a certain degree, since the transfer function $G_0$ of the power device PD in a single switching duty cycle is usually very small.

The design principle of the circuit of FIG. 3C is as discussed above. Now, a buck converter as shown in FIG. 4 is going to be depicted as an example with some given conditions and assumptions for further illustrating the details of the design according to the present invention. The transfer function $G_0$ of the power device PD is related to the PD's time or frequency domain response. As such, in discussing the response or features of the circuit, a mathematical model of the circuit is often converted from a time domain to an S domain, thus obtaining an S function of the circuit model. Taking the buck converter of FIG. 4 as an example, the S function of the gain $G_0$ can be represented by equation (11).

$$G_0 = \frac{V_{IN} \cdot R(SCR_{esr}+1)}{S^2 LC(R+R_{esr}) + S(CR_{DCR}(R_{esr}+R) + CR_{esr}R + L) + (R+R_{DCR})} \quad (11)$$

When the switching frequency fsw of the power device PD is 1 MHz, the input voltage $V_{IN}$ of the power device PD is 4.2V, the resistance $R_{esr}$ is 30 mΩ, the resistance $R_{DCR}$ is 230 mΩ, the capacitance C is 10 μF, the inductance L is 4.7 μH, and the resistance of a load R is 10Ω, it can be calculated in accordance with equations (10) and (11) that: if $q_{DPWM}=8$ bits, then $\Delta V_O \approx 0.45$ mV, and if $q_{DPWM}=5$ bits, then $\Delta V_O \approx 3.6$ mV. $SW_{(ripple)}=5$ mV; therefore, when the $V_{O(ripple)}$ is required to be lower than 10 mV, then 3.6 mV+5 mV<10 mV meets the specified requirement. In such a way, it can be deduced that when $\Delta V_O < q_{ADC}$, equation (8) applies, and when $\Delta V_O > q_{ADC}$, equation (9) applies. It should be specifically noted that the controlled variable can be a voltage as exemplified above, a current, or any other controllable variables in other systems, all of which are applicable to the concept (i.e., converting the controlled variable by an ADC unit having a higher resolution) presented in the foregoing embodiments.

In summary, the resolutions of the ADC unit 310 and the DAC unit 330 must satisfy equation (3). Under this condition, the controlled variable X (i.e., the output of the modulation system MS) is finely converted by using the ADC unit 310 having a very high resolution. In such a way, it can be assured that the data in the analog domain can be transmitted to the discrete domain with the least distortion. The ADC unit 310 can be designed in accordance with equation (4), and the DAC unit 330 can be designed in accordance with equation (5).

It should be noted that in accordance with the digitally controlled PWM concept and method discussed in the foregoing embodiments, the ADC unit 310 having a very high resolution is used to finely convert the controlled variable $V_O$, so as to ensure to transmit the data in the analog domain to the discrete domain with the least distortion. As such, the conversion characteristic curve of the ADC unit 310 of the embodiment as shown in FIGS. 3A and 3C can be as long as the quantization step $q_{ADC}$ of the ADC unit 310 and the quantization step $q_{DPWM}$ of the DPWM unit 330' satisfy equation (6) as discussed above. However, in order to comply with such a concept, the ADC unit 310 is required to have a very high resolution (i.e., more output bits). This concept seriously and disadvantageously challenges the practical design of the product (e.g., higher design complexity). Fortunately, the controlled variable $V_O$ only slightly varies when it is stable (near the rated output voltage). As such, the range which requires a high resolution conversion can be relatively narrowed, while the rest range requires a relatively low resolution. As such, in some embodiments, the ADC unit 310 of FIG. 3A or FIG. 3C can be realized by a multi-linear ADC unit or a non-linear ADC unit. FIG. 6 is a conversion characteristic curve of an ADC unit having multiple conversion slops according to an embodiment of the present invention. In an alternative, the conversion characteristic curve of the ADC unit 310 of FIGS. 3A and 3C can be a conversion characteristic curve of other geometry types. Of course, the designer may also alternatively select an ADC unit 310 having three or more slopes.

Referring to FIG. 6, when the output $V_O$ of the power device PD falls in a target region $V_{FADC}$, the ADC unit 310 in a high resolution mode converts the output $V_O$ of the power device PD into a digital feedback signal $D_{FB}$. When the output $V_O$ of the power device PD falls outside the $V_{FADC}$, the ADC unit 310 in a low resolution mode converts the output $V_O$ of the power device PD into a digital feedback signal $D_{FB}$. A quantization step $q_{ADC}$ ($q_{FADC}$ hereafter) of the high resolution mode is smaller than a quantization step $q_{ADC}$ ($q_{CADC}$ hereafter) of the low resolution mode. As such, as shown in FIG. 6, the conversion characteristic curve representing the high resolution mode (i.e., solid line section) has a greater slope than the conversion characteristic curve representing the low resolution mode (i.e., dashed line section). The quantization step $q_{FADC}$ of the high resolution mode is smaller than the quantization step $q_{DPWM}$ of the digital PWM unit 330'. When the output $V_O$ of the power device PD falls outside the target region $V_{FADC}$, the quantization step $q_{CADC}$ of the low resolution mode can be freely determined as desired by the designer. In some embodiments, the quantization step $q_{CADC}$ of the low resolution mode may be smaller than the quantization step $q_{DPWM}$ of the DPWM unit 330'. In some other embodiments, the quantization step $q_{CADC}$ of the low resolution mode may also be greater than the quantization step $q_{DPWM}$ of the DPWM unit 330'. Such an ADC unit 310 having multiple conversion slopes is not only adapted for reducing the designing complexity, but also adapted for making progress in decreasing the circuit area and improving the power consumption. In accordance with the concept of the foregoing embodiments, the DPWM unit 330' having such a low resolution can be utilized by achieving a low resolution with a delay cell type technique, a ring type technique, a counter based type technique, or any other type of technique.

The buck converter as shown in FIG. 4 is taken as an example for illustrating procedures of designing the ADC unit 310 and the DPWM unit 330'. Referring to FIGS. 3C, 4, and 6 together, first, a rated output ripple $V_{O(ripple)}$ is determined according to a product specification, by which the switching voltage region $V_{O(SW)} = V_{O(ripple)}/2$ is determined. Next, the power device PD is designed according to the specification, so as to obtain the inductance L, the capacitance C, the resistance $R_{esr}$, the resistance $R_{DCR}$, and the load resistance R. If the $V_{O(ripple)} \leq 10$ mV, then the switching voltage region $V_{O(SW)}$ is 5 mV. Further, it is assumed that the switching frequency fsw of the power device PD is 1 MHz, the input voltage $V_{IN}$ of the power device PD is 3.3V, the rated output voltage $V_O$ is 1.2V, the resistance $R_{esr}$ is 30 mΩ, the resistance $R_{DCR}$ is 230 mΩ, the capacitance C is 10 μF, the inductance L is 4.7 μH, and the resistance of a load R is 10Ω.

Therefore, the switching voltage region which is controlled by the digitally controlled PWM apparatus 300 satisfies the equation of $V_{O(SW)}=i*q_{FADC}$. If, for example, the switching voltage region $V_{O(SW)}$ has 5 setting points (i.e., i=5), then $q_{FADC}=1$ mV. In the current embodiment, it is supposed that the target region $V_{FADC}=V_{O(ripple)}+j*q_{FADC}$. In this case, if j=6, then the target region $V_{FADC}=16$ mV.

In order to ensure the ADC unit 310 to be able to convert the output voltage $V_O$ into the digital feedback signal $D_{FB}$, the quantization step $q_{CADC}$ of the low resolution mode is hereby set to satisfy the equation of $120\%*V_{O(ripple)} \leq k*q_{CADC}$. If k=5, then $q_{CADC} \approx 25$ mV. When further considering the variation of the load R, a conversion range of the low resolution mode $V_{CADC}=2*120\%*V_{O(ripple)}$.

In order to further ensure the output voltage $V_O$ to satisfy the specification, in some embodiments, equation (9) can be modified to equation (12) or (13).

$$80\%*V_{O(ripple)} \geq \Delta V_O + SW_{(ripple)} \quad (12)$$

$$30\%*V_{O(ripple)} \geq \Delta V_O \quad (13)$$

In accordance with equation (11) and the related assumptions indicated in FIG. 4, the control to output gain $G_0 \approx 3.3*(27.4*10^{-3})$. After this result of the control to output gain $G_0$ is applied in equation (10), together with equation (12) or (13), to obtain a solution, it can be obtained that the quantization step $q_{DPWM}$ of the DPWM unit 330' is less than or equal to $1/(2^5)$, or $q_{DPWM} \geq 5$ bits.

Figure 7:
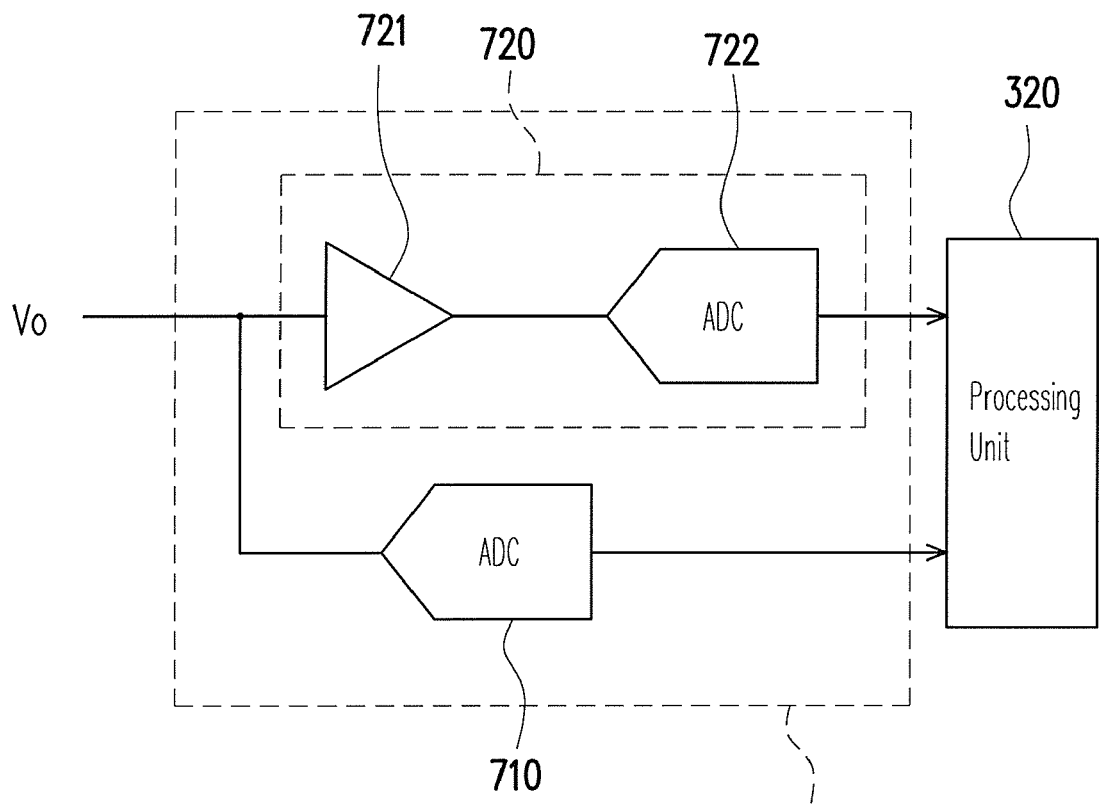
FIG. 7 illustrates an application of the ADC unit as shown in FIGS. 3A and 3C according to an embodiment of the present invention.

FIG. 7 illustrates an application of the ADC unit 310 as shown in FIGS. 3A and 3C according to an embodiment of the present invention. Referring to FIGS. 3C and 7, the ADC unit 310 includes an ADC 720 and a second ADC 710. The ADC 720 and the second ADC 710 respectively convert the output voltage $V_O$ of the power device PD into two digital signals (i.e., the digital feedback signal $D_{FB}$) having different resolutions.

The ADC 720 has a resolution higher than the second ADC 710. A quantization step $q_{FADC}$ of the ADC 720 is smaller than the quantization step $q_{DPWM}$ of the digital PWM unit 330', and a conversion region of the ADC 720 is restrained as the target region $V_{FADC}$. The second ADC 710 has a conversion region $V_{CADC}$ larger than that of the ADC 720. Therefore, the quantization step $q_{CADC}$ of the second ADC 710 is greater than the quantization step $q_{FADC}$ of the ADC 720.

The processing unit 320 receives digital signals outputted from the ADC 720 and the second ADC 710. When the output voltage $V_O$ of the power device PD is not yet converged to the target region $V_{FADC}$, the processing unit 320 selects to process the digital signals provided by the second ADC 710, thus generating a corresponding digital control signal $D_C$. When the output voltage $V_O$ of the power device PD has converged to the target region $V_{FADC}$, the processing unit 320 alternatively selects to process the digital signals provided by the ADC 720, thus generating a corresponding digital control signal $D_C$ and providing the digital control signal $D_C$ to the DPWM unit 330'.

The ADC 720, for example, can be an ADC having an output bit number higher than the output bit number of the second ADC 710. Alternatively, the ADC 720 can be realized as indicated in FIG. 7. The ADC 720 includes an amplifier 721 and a first ADC 722. The amplifier 721 receives and amplifies the output voltage $V_O$ of the power device PD. An input terminal of the first ADC 722 is coupled to an output terminal of the amplifier 721. An output terminal of the first ADC 722 is coupled to the processing unit 320. An input terminal of the second ADC 710 also receives the output voltage $V_O$ of the power device PD. An output terminal of the second ADC 710 is coupled to the processing unit 320. When the digital feedback signal $D_{FB}$ outputted from the ADC unit 310 indicates that the output voltage $V_O$ of the power device PD falls in the target region $V_{FADC}$, the processing unit 320 selects to process the output of the first ADC 722. When the digital feedback signal $D_{FB}$ outputted from the ADC unit 310 indicates that the output voltage $V_O$ of the power device PD falls outside the target region $V_{FADC}$, the processing unit 320 selects to process the output of the second ADC 710.

In the current embodiment, the output bit numbers of the first ADC 722 and the second ADC 710 are equivalent. However, even though the output bit numbers of the first ADC 722 and the second ADC 710 are equivalent, the analog input signal of the first ADC 722 is amplified by the amplifier 721, and therefore the quantization step $q_{FADC}$ of the first ADC 722 is smaller than the quantization step $q_{CADC}$ of the second ADC 710. Further, the quantization step $q_{FADC}$ of the first ADC 722 is also smaller than the quantization step $q_{DPWM}$ of the DPWM unit 330'.

In addition to the foregoing embodiments, those skilled in the art may also enable the present invention by means of other approaches in accordance with the spirit of the present invention.

Figure 9:
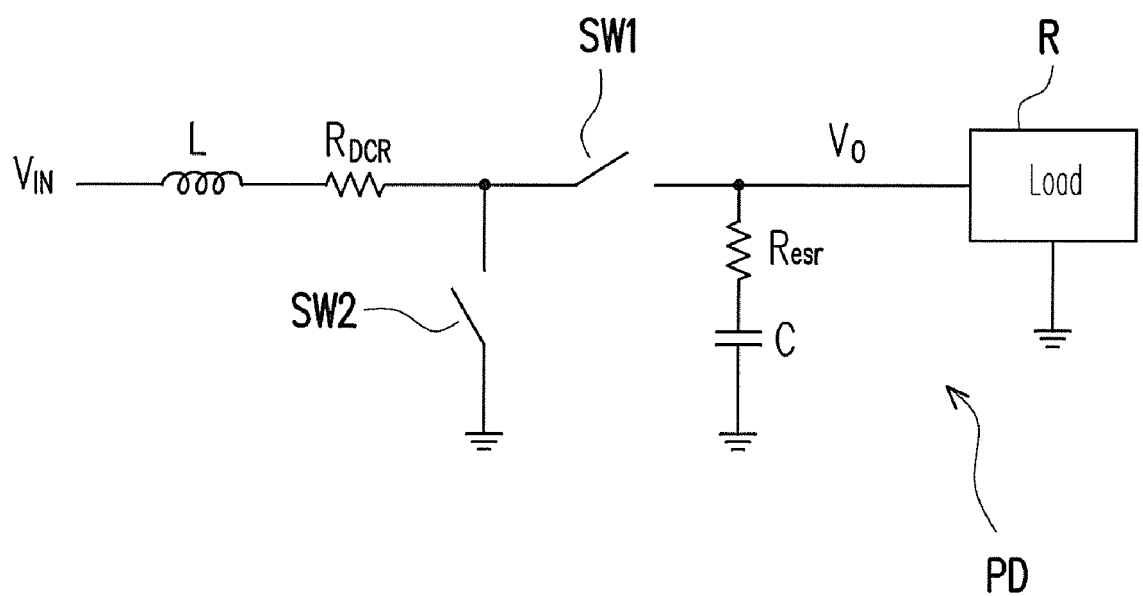
FIG. 9 is a circuit diagram of the power device PD as shown in FIG. 3C according to an embodiment of the present invention.

Furthermore, the power device PD, for example, can be a boost converter which is well known in the art. FIG. 9 is a circuit diagram of the power device PD as shown in FIG. 3C according to an embodiment of the present invention. Referring to FIGS. 3C and 9 together, as a boost converter, the power device PD includes an upper power switch SW1, a lower power switch SW2, an inductor L, and a capacitor C. The resistor $R_{DCR}$ shown in the drawing represents a parasite resistor of the inductor L, and the resistor $R_{esr}$ represents a parasite resistor of the capacitor C. The inductor L and the power switch SW1 are serially coupled between the input voltage $V_{IN}$ and the load R. The power switches SW1 and SW2 are serially coupled between the load R and the ground. The power switches SW1 and SW2 are controlled by a PWM signal $S_{PWM}$. The capacitor C is coupled between the output terminal of the power device PD and the ground. The power device PD can generate the output voltage Vo as specified, by controlling the conducting times of the power switches SW1 and SW2. The S function of the transfer function $G_0$ of the power device PD can be represented as equation (14) as follows.

$$G_0 = \frac{\frac{Vo}{D' \cdot R'} \times \left[\frac{(D' \cdot R')^2}{R + R_{esr}} - R_{DCR}\right] \times \left[(1 + S \cdot R_{esr} \cdot C)\left(1 - \frac{S \cdot L}{\frac{(D' \cdot R)^2}{R + R_{esr}} - R_{DCR}}\right)\right]}{S^2 LC\left(\frac{R + R_{esr}}{R'}\right) + S\left(\frac{L}{R'} + \frac{R \cdot R_{DCR} + R_{esr} + R_{DCR} + D' \cdot R \cdot R_{esr}}{R'} \times C\right) + 1}, \quad (14)$$

in which D'=1−D, R'=$R_{DCR}$+(R//$R_{esr}$)D'+(($R^2$+(D')$^2$)/(R+$R_{esr}$)), and D=$V_O/V_{IN}$. R//$R_{esr}$ represents a resistance value of the resistor R and the parasite resistor $R_{esr}$ which are coupled in parallel. D represents a duty cycle. In addition to replacing equation (11) with equation (14) which is the transfer function of the boost converter, details of the design of the mixed-signal control apparatus of the boost converter can be further learned by referring to FIGS. 3A and 3C and the related discussions, and therefore are not to be repeated hereby.

In summary, in the foregoing embodiments, the quantization step $q_{ADC}$ of the ADC unit 310 is smaller than the quantization step $q_{DPWM}$ of the DPWM unit 330'. As such, the voltage output $V_O$ of the power device PD is finely converted by an ADC unit 310 having a very high resolution. In such a way, it can be assured to transmit the data in the analog domain to the discrete domain with the least distortion, so as to achieve a robust and simple control. Further, the voltage output $V_O$ is rather close to the rated output voltage (i.e., the voltage output $V_O$ falls in the target region $V_{FADC}$), and differs from the rated output voltage by only a little variation. As such, in the foregoing embodiments, the high resolution conversion region in the ADC unit 310 can be shrunk (i.e., the target region $V_{FADC}$), and thereby a simple circuit can be formed. On the other hand, the ADC unit 310 having such a high resolution can correspondingly lower the resolution of the DPWM unit 330'.

Figure 8A:
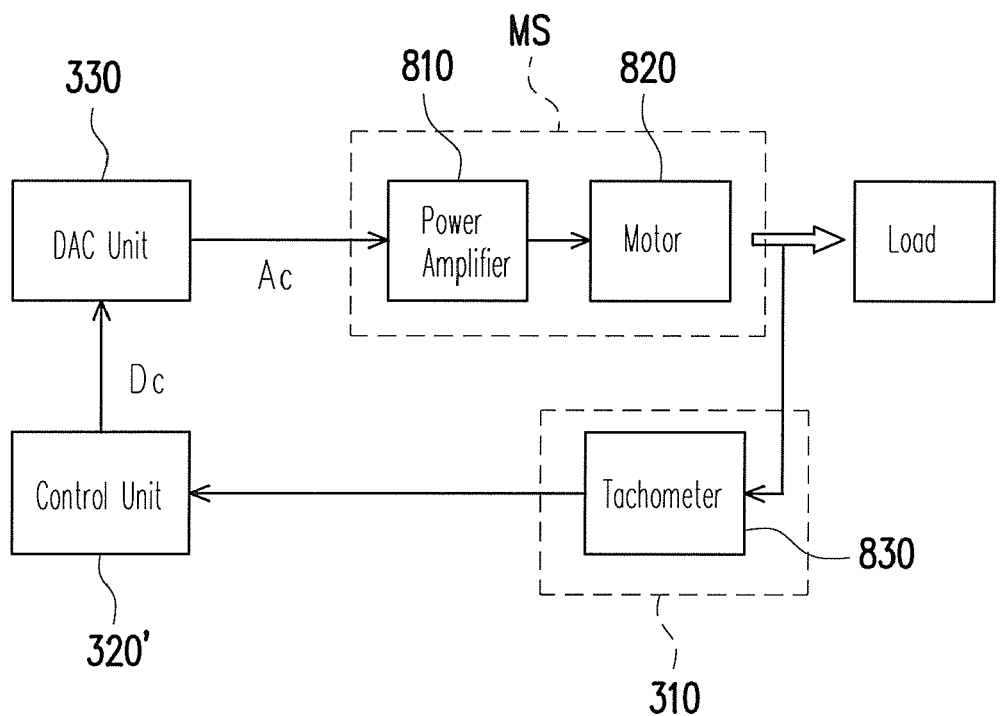
FIGS. 8A and 8B are block diagrams illustrating a mixed-signal control apparatus of a motor modulation system according to another embodiment of the present invention.

It should be specifically noted that the foregoing embodiments are given for illustration only without restricting the scope of the present invention sought to be protected. The present invention should not be construed as being only applied in the field of power devices. Instead, any mixed-signal control apparatus is incorporated into the scope of the present invention. For example, FIG. 8A is a block diagram illustrating a mixed-signal control apparatus of a motor modulation system according to another embodiment of the present invention. As shown in FIG. 8A, a modulation system MS includes a power amplifier 810 and a motor 820. The motor 820, for example, can be a DC motor, an $A_C$ motor, or of any other types. According to the electricity power provided by the power amplifier 810, the motor 820 outputs a corresponding rotation speed to the load. In this case, the rotation speed outputted by the motor 820 is a controlled variable X.

The ADC unit 310 as shown in FIG. 8A can be a tachometer 830, for example. The tachometer 830 is employed for monitoring the rotation speed outputted from the motor 820 and feeding a monitoring result in a digital manner back to a control unit 320' (corresponding to the processing unit 320 of FIG. 3A). The tachometer 830 discussed herein can be realized in any ways. For example, the tachometer 830 can be obtained by combining a conventional analog tachometer with an ADC. Typically, an analog tachometer is adapted for outputting a continuous signal. The ADC samples to convert the output of the analog tachometer into digital data and feedbacks the digital data to the control unit 320'.

According to the monitoring result fed back from the tachometer 830, the control unit 320' generates a corresponding digital control signal $D_C$. The DAC unit 330 converts the digital control signal $D_C$ into an analog control signal $A_C$ for controlling the electricity power provided by the power amplifier 810, thus further controlling the motor 820 to output a corresponding rotation speed to the load. In the current embodiment, the motor 820 is assumed to be a DC motor. When the response or features of the modulation system are to be discussed, a mathematical model of the circuit is often converted from a time domain to an S domain, thus obtaining an S function of the model of the circuit. The S function of the modulation system MS of FIG. 8A can be represented by equation (15).

$$G_0 = \frac{K_i \cdot K_{amp}}{L_a J_m S^2 + (R_a J_m + B_m L_a)S + (K_b K_i + R_a B_m)} \quad (15)$$

In equation (15), $K_{amp}$ represents a constant of the power amplifier 810, and Ki represents a torque constant of the motor 820. Further, $L_a$ represents an armature inductance of the motor 820, $J_m$ represents rotor inertia of the motor 820, $R_a$ represents an armature resistance of the motor 820, $B_m$ represents a viscous-friction coefficient of the motor 820, and $K_b$ represents a back-EMF constant of the motor 820. In addition to replacing equation (11) with equation (15), the details of the design of the mixed-signal control apparatus of FIG. 8A are similar to those illustrated in FIGS. 3A and 3C and can be learned by referring to FIGS. 3A and 3C. Therefore, no further description is further provided hereby.

Figure 8B:
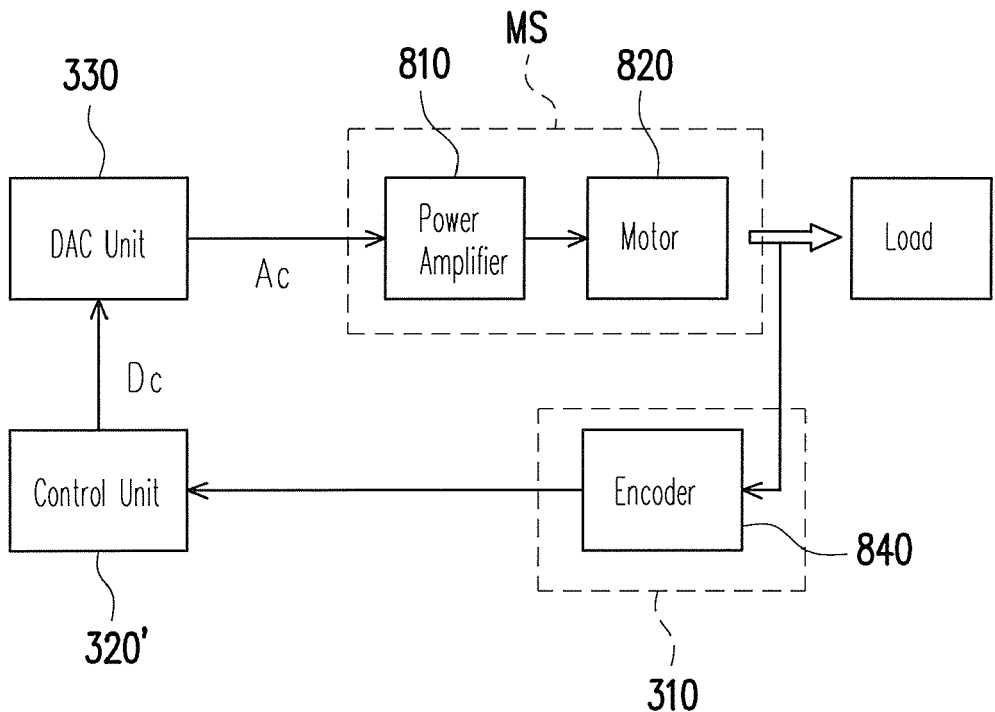

Moreover, FIG. 8B is a block diagram illustrating a mixed-signal control apparatus of a motor position modulation system according to another embodiment of the present invention. Referring to FIG. 8B, the motor 820 outputs a rotor position (a rotor angle). In this case, the rotor position (the rotor angle) is the controlled variable. In this case, the modulation system MS may include a power amplifier 810 and a motor 820. The motor 820 can be a DC motor, an AC motor, a stepping motor, or other motors. In general, FIG. 8B is similar to FIG. 8A, and thus similar parts are not repeated hereby. A difference between FIG. 8A and FIG. 8B lies in that the ADC 310 of FIG. 8B is an encoder 840. The encoder 840 is adapted for monitoring the instant position of the rotor of the motor 820 (the rotation position of the rotor) and generating a digital feedback signal by encoding the rotor position.

In some embodiments, the encoder 840 detects the instant position of the motor 820 by reading a mark on a rotating plate of the rotor of the motor 820. Next, an encoding result (a digital feedback signal) is correspondingly generated according to the read mark and is thus provided to the control unit 320'. In other embodiments, the encoder 840 may further include a variable resistor and an ADC. The rotor of the motor 820 drives the variable resistor, so as to vary the resistance of the variable resistor to achieve a corresponding analog voltage. The ADC samples the analog voltage outputted from the variable resistor and converts the sampled analog voltage into a digital feedback signal to provide the same to the control unit 320'.

According to the digital feedback signal provided by the encoder 840, the control unit 320' generates a corresponding digital control signal $D_C$. Therefore, via the DAC unit 330 and the power amplifier 810, the control unit 320' can control the motor 820 to output a corresponding rotor position to the load.

Figure 10A:
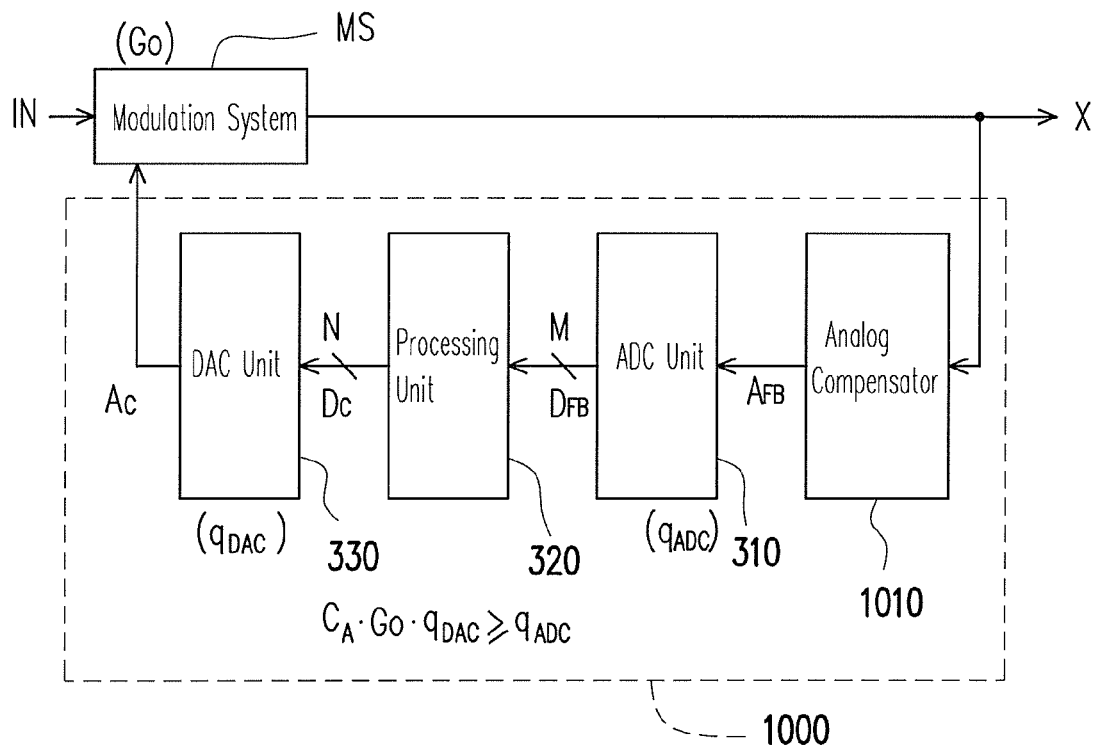
FIG. 10A is a block diagram illustrating a mixed-signal control apparatus of the modulation system MS according to another embodiment of the present invention.
Figure 10B:
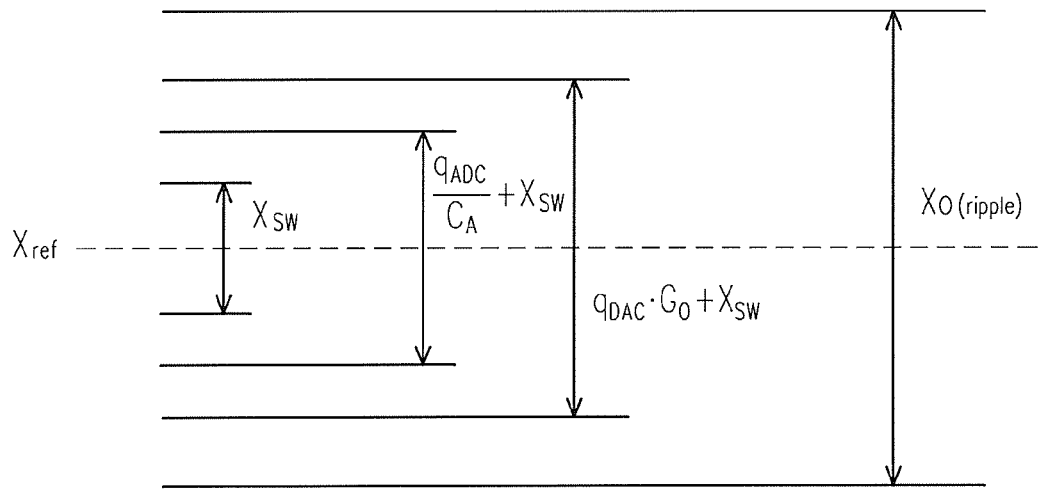
FIG. 10B illustrates a relative correlation among the controlled variable X, a disturbance $X_{SW}$, a rated output ripple $X_{O(ripple)}$, the quantization step $q_{DAC}$ of the DAC unit 330, and the quantization step $q_{ADC}$ of the ADC unit 310 of FIG. 10A.

FIG. 10A is a block diagram illustrating a mixed-signal control apparatus of the modulation system MS according to another embodiment of the present invention. FIG. 10A is similar to FIG. 3A, and thus similar parts are not repeated hereby. A difference between FIG. 10A and FIG. 3A lies in the analog compensator 1010. Referring to FIG. 10A, the modulation system MS is controlled by a mixed-signal control apparatus 1000 to modulate/convert the input IN into the controlled variable X (i.e., an output of the modulation system MS). The mixed-signal control apparatus 1000 includes an analog compensator 1010, an ADC unit 310, a processing unit 320, and a DAC unit 330. The analog compensator 1010 coupled to the modulation system MS receives and adjusts the output of the modulation system (i.e. the controlled variable X) for outputting an analog feedback signal $A_{FB}$ to the ADC unit 310. The ADC unit 310 is coupled to an output terminal of the analog compensator 1010 for generating the digital feedback signal $D_{FB}$ according to the analog feedback signal $A_{FB}$. The processing unit 320 coupled to the ADC unit 310 receives and adjusts the digital feedback signal $D_{FB}$, so as to generate a digital control signal $D_C$. The DAC unit 330 coupled between the processing unit 320 and a control terminal of the modulation system MS converts the digital control signal $D_C$ into an analog control signal $A_C$ for controlling the controlled variable X outputted from the modulation system MS. FIG. 10B illustrates a relative correlation among the controlled variable X, the disturbance $X_{SW}$, the rated output ripple $X_{O(ripple)}$, the quantization step $q_{DAC}$ of the DAC unit 330, and the quantization step $q_{ADC}$ of the ADC unit 310 of FIG. 10A. $X_{ref}$ represents an ideal value (reference value) of the controlled variable X outputted from the modulation system MS.

In the current embodiment, the relationship between the quantization step $q_{ADC}$ of the ADC unit 310 and the quantization step $q_{DAC}$ of the DAC unit 330 is designed to satisfy equation (16). It is assumed that transfer function of the analog compensator 1010 is $C_A$. The mixed-signal control apparatus 1000 should be designed for satisfying equation (17) as follows.

$$q_{ADC} \leq C_A \times G_0 \times q_{DAC} \tag{16}$$

$$q_{ADC} \leq C_A \times (X_{O(ripple)} - X_{SW}) \tag{17}$$

The foregoing modulation system MS can be any system. For example, a DC-DC converter is a typical one of the modulation systems. The DC-DC converter is adapted to modulate an input voltage $V_{IN}$ into an output voltage $V_O$ with a rated level. When a power device PD is exemplified for illustrating the modulation system MS of the present invention, the controlled variable X can be the output voltage $V_O$, and the mixed-signal control apparatus 1000 can be a digitally controlled PWM apparatus, in which the DAC unit 330 can be a DPWM unit 330'. Therefore, a quantization step $q_{DPWM}$ of the DPWM unit 330' in the following embodiment as shown in FIG. 10B is equivalent to the quantization step $q_{DAC}$ of the DAC unit 330 as shown in FIG. 10A. In other embodiments, the DAC unit 330 may be a pulse amplitude modulation (PAM) unit or other conversion units.

Figure 10C:
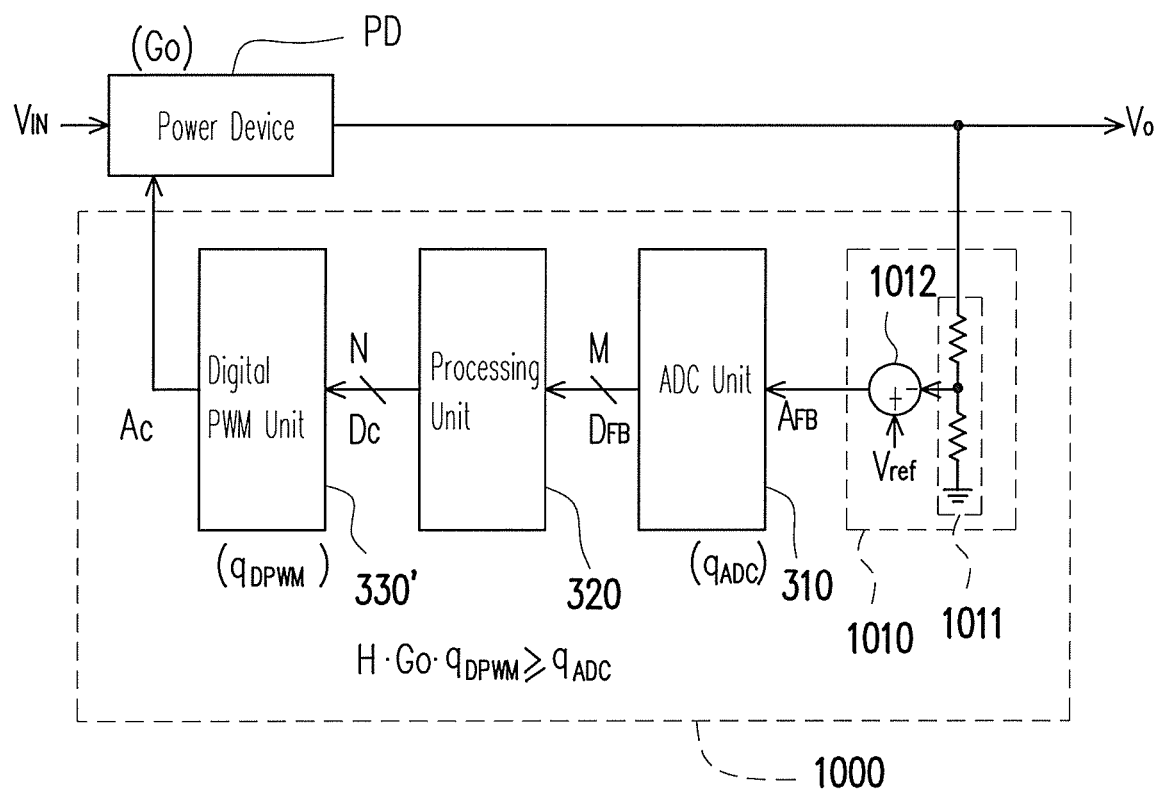
FIG. 10C is a block diagram illustrating a digitally controlled PWM apparatus according to an embodiment of the present invention.

FIG. 10C is a block diagram illustrating a digitally controlled PWM apparatus according to an embodiment of the present invention. Referring to FIG. 10C, the digitally controlled PWM apparatus (i.e., the mixed-signal control apparatus 1000) includes an analog compensator 1010, an ADC unit 310, a processing unit 320, and a digital PWM unit 330'. FIG. 10C is similar to FIG. 3C, and thus similar parts are not repeated hereby. A difference between FIG. 10C and FIG. 3C lies in the analog compensator 1010. In the current embodiment, the analog compensator 1010 comprises a voltage divider 1011 and a voltage adder 1012. The voltage divider 1011 couples to the power device PD for dividing the output of the power device PD (i.e. the output voltage $V_O$) and output a divided voltage. The voltage adder 1012 coupled between the voltage divider and the ADC unit 310 adds the divided voltage with a reference voltage Vref to output the analog feedback signal $A_{FB}$ to the ADC unit 310.

In the current embodiment, the relationship between the quantization step $q_{ADC}$ of the ADC unit 310 and the quantization step $q_{DPWM}$ of the digital PWM unit 330' is designed to satisfy equation (18). It is assumed that transfer function of the voltage divider 1011 is H. $G_0$ represents a control to output gain, which is the transfer function of the power device PD. The mixed-signal control apparatus 1000 should be designed for satisfying equation (19) as follows.

$$q_{ADC} \leq H \times G_0 \times q_{DPWM} \tag{18}$$

$$q_{ADC} \leq H \times (V_{O(ripple)} - SW_{(ripple)}) \tag{19}$$

Further, with respect to the digital PWM unit 330', the controlled variable X (i.e. the output voltage $V_O$) generated by the quantization step $q_{DAC}$ via the power device PD can be set within the range of "the rated output ripple $V_{O(ripple)}$ minus the fixed system disturbance $SW_{(ripple)}$". In other words, in some other embodiments, the mixed-signal control apparatus 1000 should be designed to satisfy equation (20) as follows.

$$q_{DPWM} \leq \frac{V_{O(ripple)} - SW_{(ripple)}}{G_0} \tag{20}$$

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mixed-signal control apparatus of a modulation system, comprising:
   a digital-to-analog converter (DAC) unit for outputting an analog control signal for controlling an output of the modulation system;
   an analog-to-digital converter (ADC) unit for generating a digital feedback signal according to the output of the modulation system, wherein if a quantization of the ADC unit is $q_{ADC}$, a quantization of the DAC unit is $q_{DAC}$, and a transfer function of the modulation system is $G_0$, then $q_{ADC} \leq G_0 q_{DAC}$; and
   a processing unit, coupled between the ADC unit and the DAC unit, the processing unit receives and regulates the digital feedback signal for generating a digital control signal.

2. The mixed-signal control apparatus according to claim 1, wherein if an input of the modulation system is $V_{IN}$, and a bit number of the digital control signal received by the DAC unit is N, then the quantization of the DAC unit is $V_{IN}/2^N$.

3. The mixed-signal control apparatus according to claim 1, wherein if an input of the modulation system is $V_{IN}$, and a bit number of the digital feedback signal outputted from the ADC unit is M, then the quantization of the ADC unit is $V_{IN}/2^M$.

4. The mixed-signal control apparatus according to claim 1, wherein if a rated output ripple is $X_{O(ripple)}$, and a disturbance of the modulation system is $X_{SW}$, then $q_{ADC} \leq X_{O(ripple)} - X_{SW}$.

5. The mixed-signal control apparatus according to claim 1, wherein if a rated output ripple is $X_{O(ripple)}$, and a disturbance of the modulation system is $X_{SW}$, then $$q_{DAC} \leq \frac{X_{O(ripple)} - X_{SW}}{G_0}.$$

6. The mixed-signal control apparatus according to claim 1, wherein the processing unit is a proportional-integral-differential (PID) processor.

7. The mixed-signal control apparatus according to claim 1, wherein when the output of the modulation system falls in a target region, the ADC unit in a high resolution mode converts the output of the modulation system into the digital feedback signal, and when the output of the modulation system falls outside the target region, the ADC unit in a low resolution mode converts the output of the modulation system into the digital feedback signal, a quantization of the high resolution mode being smaller than $G_O q_{DAC}$.

8. The mixed-signal control apparatus according to claim 7, wherein a quantization of the low resolution mode is greater than the quantization of the high resolution.

9. The mixed-signal control apparatus according to claim 1, wherein the ADC unit further comprises:
- an amplifier for receiving and amplifying the output of the modulation system;
- a first ADC, comprising an input terminal coupled to an output terminal of the amplifier and an output terminal coupled to the processing unit; and
- a second ADC, comprising an input terminal receiving the output of the modulation system and an output terminal coupled to the processing unit,
- wherein when the digital feedback signal outputted from the ADC unit indicates that the output of the modulation system falls in a target region, the processing unit selects to process an output of the first ADC, and when the digital feedback signal outputted from the ADC unit indicates that the output of the modulation system falls outside the target region, the processing unit selects to process an output of the second ADC.

10. The mixed-signal control apparatus according to claim 9, wherein the outputs of the first ADC and the second ADC have a same bit number.

11. The mixed-signal control apparatus according to claim 9, wherein the first ADC has a quantization smaller than the quantization of the DAC unit, $q_{DAC}$.

12. The mixed-signal control apparatus according to claim 1, wherein when the output of the modulation system is outside of a range of a rated output ripple, each of the ADC unit and the DAC unit has a monotone increasing conversion characteristic.

13. The mixed-signal control apparatus according to claim 1, wherein the modulation system is a power device.

14. The mixed-signal control apparatus according to claim 13, wherein the power device is a DC-DC converter.

15. The mixed-signal control apparatus according to claim 13, wherein the power device is a buck converter.

16. The mixed-signal control apparatus according to claim 13, wherein the power device is a boost converter.

17. The mixed-signal control apparatus according to claim 1 being a digitally controlled pulse width modulation (digitally controlled PWM) apparatus.

18. The mixed-signal control apparatus according to claim 17, wherein the DAC unit is a digital PWM (DPWM) unit converting the digital control signal into a PWM signal as an analog control signal for controlling the output of the modulation system.

19. The mixed-signal control apparatus according to claim 1, wherein the modulation system is a motor modulation system.

20. The mixed-signal control apparatus according to claim 1, comprising:
- an analog compensator, coupled between the ADC unit and the modulation system, for receiving and adjusting the output of the modulation system and outputting an analog feedback signal to the ADC unit, wherein the ADC unit generating the digital feedback signal according to the analog feedback signal.

21. The mixed-signal control apparatus according to claim 20, wherein the analog compensator comprises:
- a voltage divider, coupled to the modulation system, for dividing the output of the modulation system and output a divided voltage; and
- a voltage adder, coupled between the voltage divider and the ADC unit, for adding the divided voltage with a reference voltage to output the analog feedback signal to the ADC unit.

* * * * *